United States Patent
Zhang et al.

(10) Patent No.: US 9,410,096 B2
(45) Date of Patent: Aug. 9, 2016

(54) METHOD AND SYSTEM FOR COOLING AND WASHING BIOMASS SYNGAS

(71) Applicant: WUHAN KAIDI GENERAL RESEARCH INSTITUTE OF ENGINEERING & TECHNOLOGY CO., LTD., Wuhan (CN)

(72) Inventors: Yanfeng Zhang, Wuhan (CN); Wenyan Liu, Wuhan (CN); Minggui Xia, Wuhan (CN); Liang Zhang, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 246 days.

(21) Appl. No.: 14/316,842

(22) Filed: Jun. 27, 2014

(65) Prior Publication Data

US 2014/0305044 A1  Oct. 16, 2014

Related U.S. Application Data

(63) Continuation-in-part of application No. PCT/CN2012/083597, filed on Oct. 26, 2012.

(30) Foreign Application Priority Data

Dec. 29, 2011  (CN) .......................... 2011 1 0449513

(51) Int. Cl.
| | |
|---|---|
| *C01B 7/00* | (2006.01) |
| *C10J 3/84* | (2006.01) |
| *C10K 1/02* | (2006.01) |
| *C10K 1/06* | (2006.01) |

(Continued)

(52) U.S. Cl.
CPC .. *C10J 3/845* (2013.01); *C10J 3/20* (2013.01); *C10J 3/723* (2013.01); *C10J 3/74* (2013.01); *C10J 3/86* (2013.01); *C10K 1/02* (2013.01); *C10K 1/028* (2013.01); *C10K 1/046* (2013.01); *C10K 1/06* (2013.01); *C10K 1/08* (2013.01); *C10K 1/10* (2013.01); *C10K 1/101* (2013.01); *C10G 2300/1011* (2013.01); *C10J 2300/1693* (2013.01); *C10J 2300/1884* (2013.01); *C10J 2300/1892* (2013.01); *Y02P 20/129* (2015.11); *Y02P 30/20* (2015.11)

(58) Field of Classification Search
CPC ........................................................ C10K 1/028
See application file for complete search history.

(56) References Cited

U.S. PATENT DOCUMENTS

| | | | | |
|---|---|---|---|---|
| 2008/0275278 | A1* | 11/2008 | Clark | ........................ C10G 2/32 585/240 |
| 2011/0315537 | A1* | 12/2011 | Daugaard | ............ B01D 5/0027 201/19 |

(Continued)

*Primary Examiner* — Imran Akram

(74) *Attorney, Agent, or Firm* — Matthias Scholl P.C.; Matthias Scholl

(57) ABSTRACT

A method for cooling and washing biomass syngas, the method including the following steps: 1) introducing biomass syngas having a temperature of between 1000 and 1100° C., a dust content of less than 20 g/Nm³, and a tar content of less than 3 g/Nm³ to a quench tower for condensing a slag; 2) introducing the biomass syngas after slag condensation to a waste heat boiler for recovering waste heat and condensing a heavy tar in the syngas; 3) introducing the biomass syngas from the waste heat boiler to a scrubbing-cooling tower for removing dust and decreasing a temperature of the syngas; and 4) introducing the biomass syngas after dust removal and temperature decrease from the scrubbing-cooling tower to an electro-precipitator for further removal of the dust and the tar.

13 Claims, 12 Drawing Sheets

(51) Int. Cl.
*C10K 1/10* (2006.01)
*C10K 1/08* (2006.01)
*C10J 3/20* (2006.01)
*C10J 3/72* (2006.01)
*C10J 3/74* (2006.01)
*C10J 3/86* (2006.01)
*C10K 1/04* (2006.01)

(56) References Cited

U.S. PATENT DOCUMENTS

2012/0128560 A1* 5/2012 Krishnamurthy ...... B01D 53/52
423/226
2013/0000569 A1* 1/2013 Schneider ............... F02B 43/08
123/3

* cited by examiner

METHOD AND SYSTEM FOR COOLING AND WASHING BIOMASS SYNGAS

CROSS-REFERENCE TO RELATED APPLICATIONS

This application is a continuation-in-part of International Patent Application No. PCT/CN2012/083597 with an international filing date of Oct. 26, 2012, designating the United States, now pending, and further claims priority benefits to Chinese Patent Application No. 201110449513.7 filed Dec. 29, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a method and a system for cooling and washing biomass syngas.

2. Description of the Related Art

Like the coal gas production, the biomass gas production requires cooling and washing. Currently, the purification of the biomass syngas mainly adopts conventional method for cooling and washing the coal gas.

The cooling of the coal gas generally is conducted in the gasifier, out of the gasifier, or a combination thereof.

When water is used to cool the syngas in the gasifier, the gasifier has a complicate structure and a large size. Slag easily adheres to a wall surface of the gasifier, scale easily forms on the water side of the gasifier, and hidden dangers, like pipe explosion and perforation and water leakage, exist. When gas is used to cool the syngas in the gasifier, the gas consumption is large, the mixed gas increases by a large volume, so that dimensions of the subsequent devices correspondingly increase. In addition, the main process and the circulating coal gas process require large energy consumption.

When water is used to cool the syngas out of the gasifier, the temperature of the syngas is cooled to between 200 and 300° C., however, this method is only applicable to particular chemical syngas, thereby having large limitation.

When the high temperature syngas is cooled by using a radiation waste heat boiler, the waste heat boiler is required to have relatively large heating surface of the slag, and has to be equipped with a particular dust removal device, which increases the device investment.

Methods for removing dust from coal gas include: precipitation, filter, cyclone precipitation, electric precipitation, water washing, and dust removal by Venturi scrubber. Different dust removal methods vary in the effect of the dust removal and the resistance consumption.

Characteristics of different syngas produced from different raw materials and by different gasification processes are not all the same. However, targeted process method and system configuration should be adopted to ensure advanced purification target and economy target. Characterized in complicate system, long procedure, high energy consumption, low efficiency and stability, and being uneconomic, the conventional methods for coal gas purification must be optimized and developed when it is applied to treat the biomass syngas.

SUMMARY OF THE INVENTION

In view of the above-described problems, it is one objective of the invention to provide a method and a system for cooling and washing biomass syngas. The method is smooth, and the system is simple and has low energy consumption and high efficiency.

To achieve the above objective, in accordance with one embodiment of the invention, there is provided a method for cooling and washing biomass syngas. The biomass syngas has a temperature of between 1000 and 1100° C., a dust content of less than 20 g/Nm$^3$, and a tar content of less than 3 g/Nm$^3$. The method comprises the following steps:

1) introducing the syngas to a quench tower for condensing a slag;

2) introducing the syngas after slag condensation to a waste heat boiler for recovering waste heat and condensing a heavy tar in the syngas;

3) introducing the syngas from the waste heat boiler to a scrubbing-cooling tower for removing dust and decreasing a temperature of the syngas; and 4) introducing the syngas after dust removal and temperature decrease from the scrubbing-cooling tower to an electro-precipitator for further removing the dust and the tar.

The syngas after being cooled by the quench tower in step 1) has the temperature of between 780 and 820° C.

In step 1), the syngas is preliminarily cooled by a water-cooling flue device before entering to the quench tower.

In step 2), the waste heat is recovered in a high temperature section and a low temperature section. The high temperature section is a water-pipe waste heat boiler, and the temperature of the syngas at an outlet thereof is controlled at between 400 and 450° C. The low temperature section is a heat-pipe waste heat boiler, and the temperature of the syngas at an outlet thereof is controlled at 200° C. below.

A pressure of waste heat steam in the high temperature section is larger than 1.6 megapascal. A pressure of waste heat steam in the low temperature section is between 0.5 and 1.6 megapascal.

In step 1), the quench tower is a water-cooling quench tower. The syngas is preliminarily cooled by the water-cooling flue device and transported to the water-cooing quench tower. The waste heat recovered by the water-cooling flue device and the water-cooling quench tower is transported to the heat-pipe waste heat boiler for conducting steam-water separation, and the water is circulated for use.

In step 3), the temperature of the syngas in the scrubbing-cooling tower is decreased to between 40 and 45° C.

It is another objective of the invention to provide a system for cooling and washing biomass syngas. The system comprises a quench tower connected to a high temperature pyrolysis gasifier. The quench tower is connected to a waste heat boiler, a scrubbing-cooling tower, and an electro-precipitator via a syngas pipeline.

The high temperature pyrolysis gasifier is connected to the quench tower via a water-cooling flue device.

The water-cooling flue device comprises: a water-cooling flue and first heating pipes. The water-cooling flue is formed by an inlet water-cooling flue, an upper-bend water-cooling flue, a straight water-cooling flue, a lower-bend water-cooling flue, and an outlet water-cooling flue in series and sealed connection. The first heating pipes are circumferentially arranged, and adjacent first heating pipes are seamlessly connected via first steel plate strips to form an annular water-cooling wall. A cavity of the annular water-cooling wall forms the flues of different sections.

The inlet water-cooling flue comprises an inlet annular header and an inlet annular water-cooling wall. The inlet annular water-cooling wall is connected to the upper-bend water-cooling flue. The inlet annular header is provided with a cooling medium inlet pipe for inputting a cooling medium and a plurality of adaptors connected to the first heating pipes, respectively. A structure of the outlet water-cooling flue is the same as that of the inlet water-cooling flue. An inner wall of the water-cooling flue is provided with a first refractory layer having a thickness of between 60 and 80 mm.

The quench tower is the water-cooling quench tower.

The water-cooling quench tower comprises a sealed water-cooling cylinder. The water-cooling cylinder is surrounded by a plurality of second heating pipes, and adjacent second heating pipes are in sealed connection. Lower ends of all the second heating pipes are connected to an inlet header for inputting cooling water; upper ends of all the second heating pipes are connected to an outlet header for outputting the cooling water. A first inlet joint is disposed on an upper part of a wall of the water-cooling cylinder for inputting the syngas to be treated. A first outlet joint is disposed on a lower part of the wall of the water-cooling cylinder for outputting the syngas after treatment. The lower part of the water-cooling cylinder is in the shape of an inverted cone, and a bottom of the inverted cone is provided with a slag outlet.

A plurality of water spray pipes are disposed on a top of the water-cooling cylinder. A spray-pipe system of the water spray pipe comprises: a surge tank and an atomizing nozzle. The water spray pipe is disposed between the surge tank and the atomizing nozzle. A water outlet of the surge tank is connected to the water spray pipe via a water outlet valve. A water inlet of the surge tank is connected to a water inlet valve. The surge tank is further provided with a gas inlet and a gas outlet; the gas inlet of the surge tank is connected to a gas inlet valve; and the gas outlet of the surge tank is connected to a gas outlet valve.

The waste heat boiler comprises a water-pipe waste heat boiler and a heat-pipe waste heat boiler connected in series.

The water-pipe waste heat boiler comprises: a first drum and a boiler body disposed beneath the first drum. The boiler body is in a horizontal structure. A second inlet joint and a second outlet joint are disposed on two horizontal ends of the boiler body. The boiler body comprises: a wall of the boiler and a plurality of third heating pipes arranged longitudinally. Top ends of all the third heating pipes are connected to an upper header via an upper connector pipe. Bottom ends of all the third heating pipes are connected to a lower header via a lower connector pipe. The upper header is connected to the first drum via a steam outlet pipe for recovering steam. The lower header is connected to the bottom of the first drum via a downcomer for supplying cooling water. Two side walls of the boiler body are membrane wall tube panels. An upper end and a lower end of each membrane wall tube panel are connected to the upper header and the lower header, respectively.

The heat-pipe waste heat boiler comprises: fourth heating pipes, a second drum, and a thermal-insulating wall. The fourth heating pipes are heat pipes. A heat release section of each heating pipe is inserted in the second drum, and a heat absorbing section of each heating pipe is disposed in the thermal-insulating wall. The thermal-insulating wall is connected to a third inlet joint and a third outlet joint by welding, and a lower end of the thermal-insulating wall is connected to an ash hopper by welding.

The quench tower is a water-cooling quench tower. The high-temperature pyrolysis gasifier is connected to the water-cooling quench tower via the water-cooling flue device. A water pipeline of the heat-pipe waste heat boiler is in series connection with a water pipeline of the water-cooling flue device and a water pipeline of the water-cooling quench tower to form a water circulating system.

The scrubbing-cooling tower is a packed scrubbing-cooling tower.

The electro-precipitator is a wet electro-precipitator.

A gas outlet of the electro-precipitator is connected to a gas holder and a flare by a fan.

Compared with the existing purification treatment of the coal gas, advantages according to embodiments of the invention are summarized as follows: Quenching process is performed out of the gasifier by spraying water, so that the gasification process is not affected. Both the effect of the slag condensation and the thermal efficiency of the system are improved by controlling the quenching degree. The configuration of the two sections of waste heat boilers under two pressures reaches a centralized collection of the heavy tar, gradual waste heat recovery, and improvement of the heat efficiency of the devices. The scrubbing-cooling tower and the electro-precipitator are employed to remove the dust and the tar, thereby realizing gradual purification of the syngas. The whole process is smooth, and the structure of the system is simple.

Figure 1:
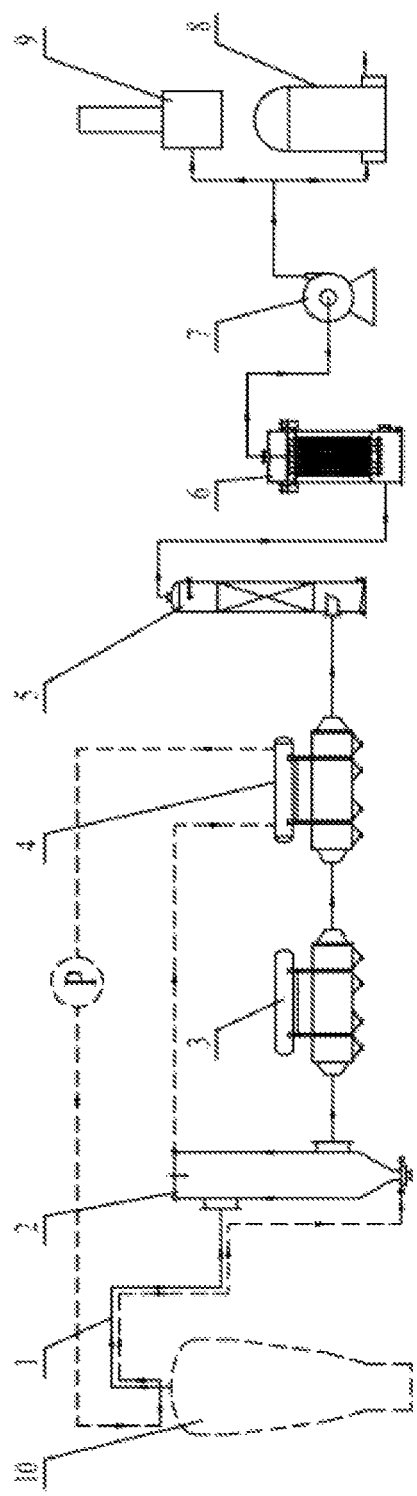
FIG. 1 is a structure diagram of a system for cooling and washing biomass syngas.

In the drawings, the following reference numbers are used: 1. Water-cooling flue device (1.1. Inlet water-cooling flue; 1.2. Upper-bend water-cooling flue; 1.3. Straight water-cooling flue; 1.4. Lower-bend water-cooling flue; 1.5. Outlet water-cooling flue; 1.6. First refractory layer; 1.7. First heating pipe; 1.8 First steel plate strip); 2. Water-cooling quench tower (2.1. Water-cooling cylinder; 2.2. Water spray pipe; 2.3. Outlet header; 2.4. First inlet joint; 2.5. Additional heating structure; 2.6. First outlet joint; 2.7. Inlet header; 2.8. Slag outlet; 2.9. Second heating pipe; 2.10. Second steel plate strip; 2.11. First heat insulation layer; 2.12. Second refractory layer); 3. Water-pipe waste heat boiler (3.1. Third heating pipe; 3.2. Membrane wall tube panel; 3.3. Upper connector pipe; 3.4. Upper header; 3.5. Lower connector pipe; 3.6. Lower header; 3.7. First drum; 3.8. Steam outlet pipe; 3.9. Downcomer; 3.10. Ash hopper; 3.11. Second heat insulation layer; 3.12. Second inlet joint; 3.13. Second outlet joint); 4. Heat-pipe waste heat boiler (4.1. Fourth heating pipe; 4.2. Second drum; 4.3. Sealed pipe sleeve; 4.4. Ash hopper; 4.5. Third inlet joint; 4.6. Third outlet joint; 4.7. Thermal-insulating wall); 5. Scrubbing-cooling tower; 6. Electro-precipitator; 7. Fan; 8. Gas holder; 9. Flare; 10. High-temperature pyrolysis gasifier; 11. Steel-plate insulated flue; 12. Spray-pipe system of water spray pipe (12.1. Surge tank; 12.2. Water inlet valve; 12.3. Gas inlet valve; 12.4. Gas outlet valve; 12.5.

Adjustment controller; 12.6. Water outlet valve; 12.7. Throttle orifice; 12.8. Shut-off valve; 12.9. Pressure gage; 12.10. Atomizing nozzle).

DETAILED DESCRIPTION OF THE EMBODIMENTS

Detailed embodiments of the invention is specifically illustrated combined with the drawings:

As shown in FIG. 1, a system for cooling and washing biomass syngas of the invention comprises: a water-cooling quench tower 2 connected to a high-temperature pyrolysis gasifier 10 via a water-cooling flue device 1. The water-cooling quench tower 2 is connected to a water-pipe waste heat boiler 3, a heat-pipe waste heat boiler 4, a scrubbing-cooling tower 5, and an electro-precipitator 6, respectively, via a syngas pipeline. To recover and use the heat energy, a water pipeline of the heat-pipe waste heat boiler 4, a water pipeline of the water-cooling flue device 1, and a water pipeline of the water-cooling quench tower 2 are connected in series to form a water circulating system, thereby enabling waste heat recovered from the water-cooling flue device 1 and water-cooling quench tower 2 to be applied in the heat-pipe waste heat boiler 4. In addition, a gas outlet of the electro-precipitator 6 is connected to a gas holder 8 and a flare 9 respectively via a fan 7. The scrubbing-cooling tower 5 employs a packed scrubbing-cooling tower, the electro-precipitator 6 employs a wet electro-precipitator, and the gas holder 8 employs a wet gas holder.

Figure 2:
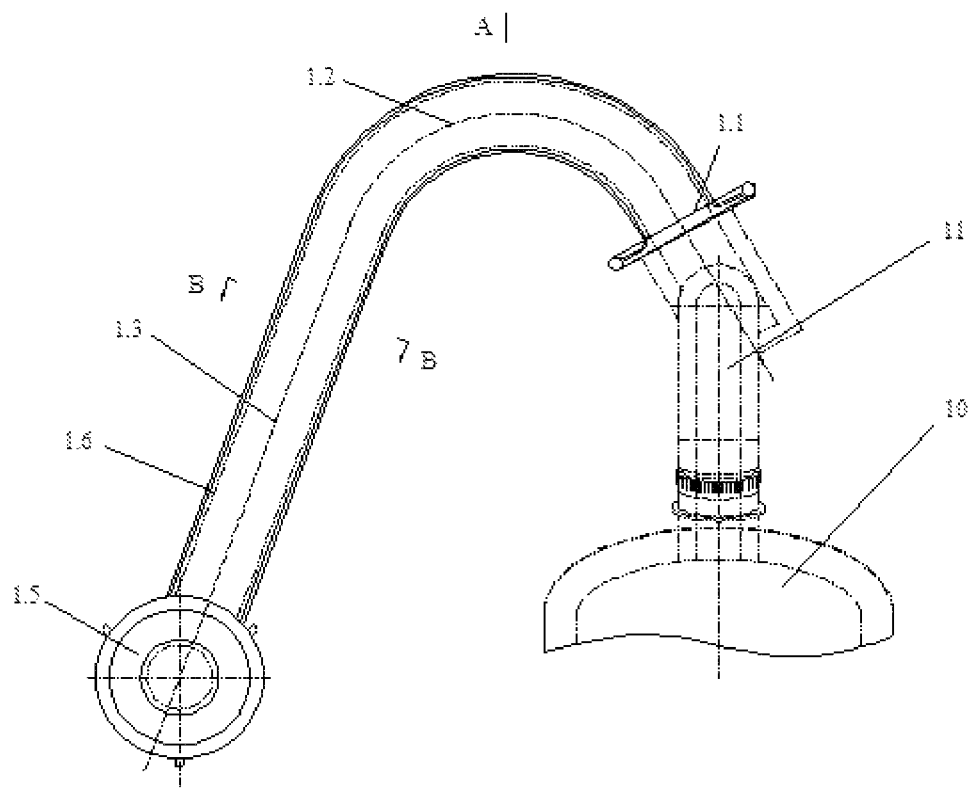
FIG. 2 is a structure diagram of a water-cooling flue device of FIG. 1.
Figure 3:
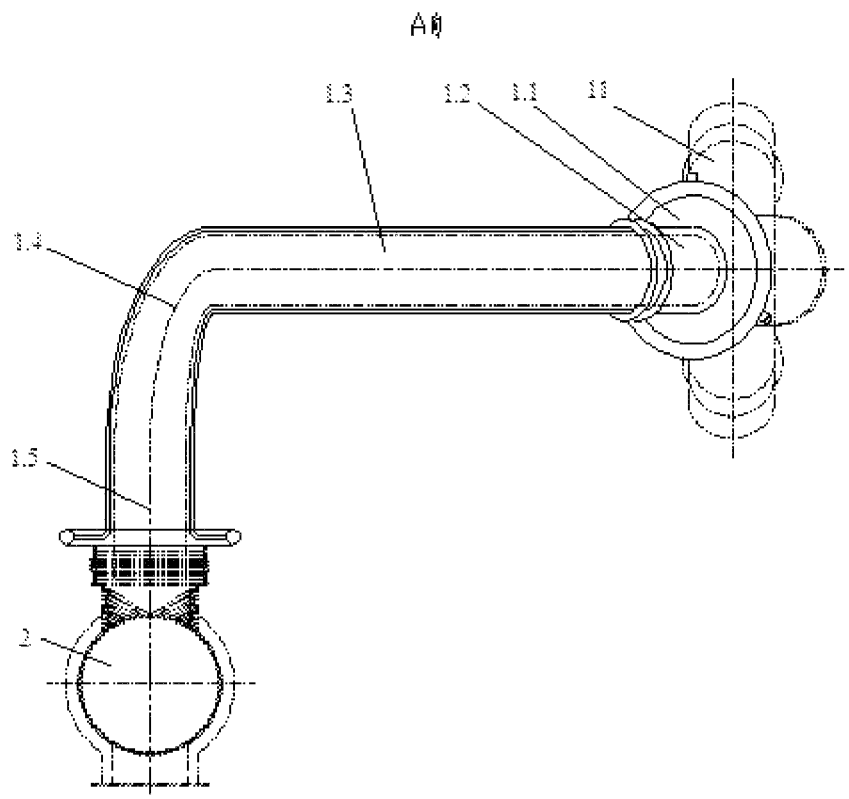
FIG. 3 is a top view along direction A of FIG. 2.
Figure 4:
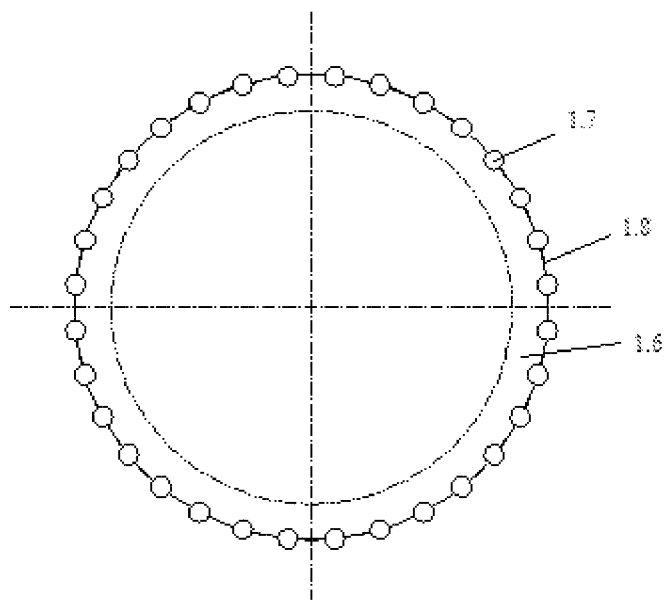
FIG. 4 is an enlarged view taken from line B-B of FIG. 2.

Preferably, the water-cooling flue device 1 is connected to the high-temperature pyrolysis gasifier 10 and the water-cooling quench tower 2, so that defects of the common gas flue, that the common gas flue only functions in connection but not in flue gas cooling, are avoided. The common flue is in a barrel structure that is rolled by a steel plate or formed by a steel pipe of a large diameter, and a refractory castable having a thickness of between 200 and 300 mm is casted on an inwall of the barrel structure. The common flue of such structure is adiabatic, thereby imposing high requirement of cooling capability on the subsequent cooling devices. On the other hand, the weight of the flue is heavy in the presence of the refractory castable having the thickness of between 200 and 300 mm, and the refractory castable is prone to fall off, thereby resulting in burn-through of the barrel structure of the flue and the flue gas leakage, or even the risk of fire or explosion. As shown in FIGS. 2-4, the water-cooling flue device 1 comprises a water-cooling flue and first heating pipes 1.7. The water-cooling flue is formed by an inlet water-cooling flue 1.1, an upper-bend water-cooling flue 1.2, a straight water-cooling flue 1.3, a lower-bend water-cooling flue 1.4, and an outlet water-cooling flue 1.5 in series and sealed connection. The first heating pipes 1.7 are circumferentially arranged, and adjacent first heating pipes 1.7 are seamlessly connected via first steel plate strips 1.8 to form an annular water-cooling wall. A cavity of the annular water-cooling wall forms the flues of different sections. The inlet water-cooling flue 1.1 comprises an inlet annular header and an inlet annular water-cooling wall. The inlet annular water-cooling wall is connected to the upper-bend water-cooling flue 1.2. The inlet annular header is provided with a cooling medium inlet pipe for inputting a cooling medium. Herein the cooling medium is circulating water introduced out of the heat-pipe waste heat boiler. The inlet annular header is further provided with a plurality of adaptors connected to the first heating pipes 1.7, respectively. A structure of the outlet water-cooling flue 1.5 is the same as that of the inlet water-cooling flue 1.1. An inner wall of the water-cooling flue is provided with a first refractory layer 1.6 having a thickness of between 60 and 80 mm, preferably 70 mm, for improving the high temperature resistance and wear resistance performance and prolonging the service life thereof. Thus, the cooling water introduced out of the heat-pipe waste heat boiler 4 enters the inlet annular header of the inlet water-cooling flue 1.1, evenly passes through the first heating pipes 1.7 that form different sections of the water-cooling flue, accumulates in an outlet annular header of the outlet water-cooling flue 1.5, and finally enters the quench tower. The cooling water continuously absorbs the heat energy from the biomass syngas during the flowing process, so that the temperature of the cooling water increases while the temperature of the biomass syngas decreases, thereby realizing the heat exchange therebetween. The water-cooling flue device 1 functions in flue gas transportation as well as in cooling the flue gas. Thus, the temperature of the inner wall of the flue is low, the tar is not prone to condense, the tar adhesion and ash clog resulted from tar condensation is effectively prevented, thereby ensuring the stability of long-term operation of the device. Besides, the flue does not require the refractory castable of the large thickness, so that the burn-through of the barrel structure of the flue and the flue gas leakage resulting from the fracture and collapse of the refractory castable are avoided, and the security for the long-term operation of the device is ensured. It should be understood that the common flue also can achieve the technical scheme of the invention, but effect thereof is not good.

Figure 5:
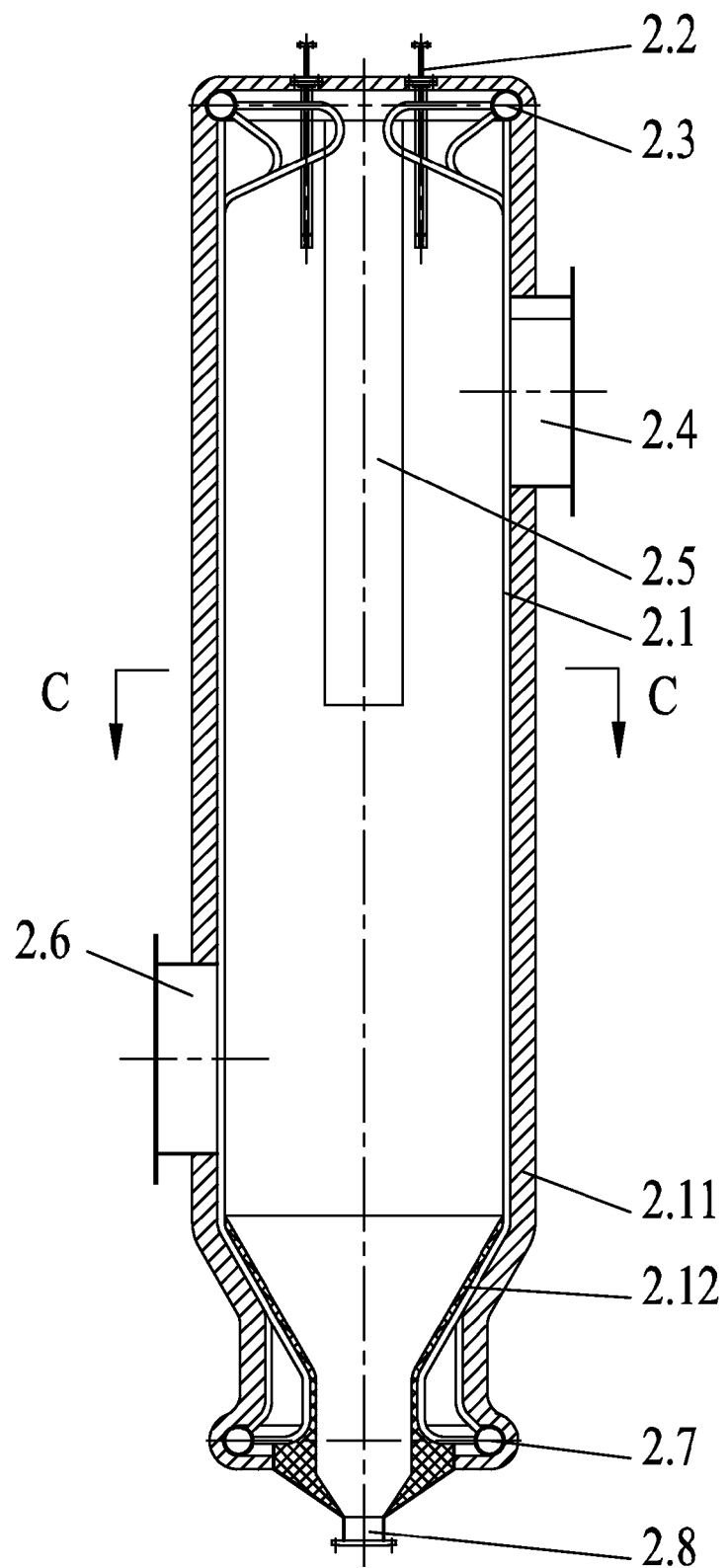
FIG. 5 is a structure diagram of a water-cooling quench tower of FIG. 1.
Figure 6:
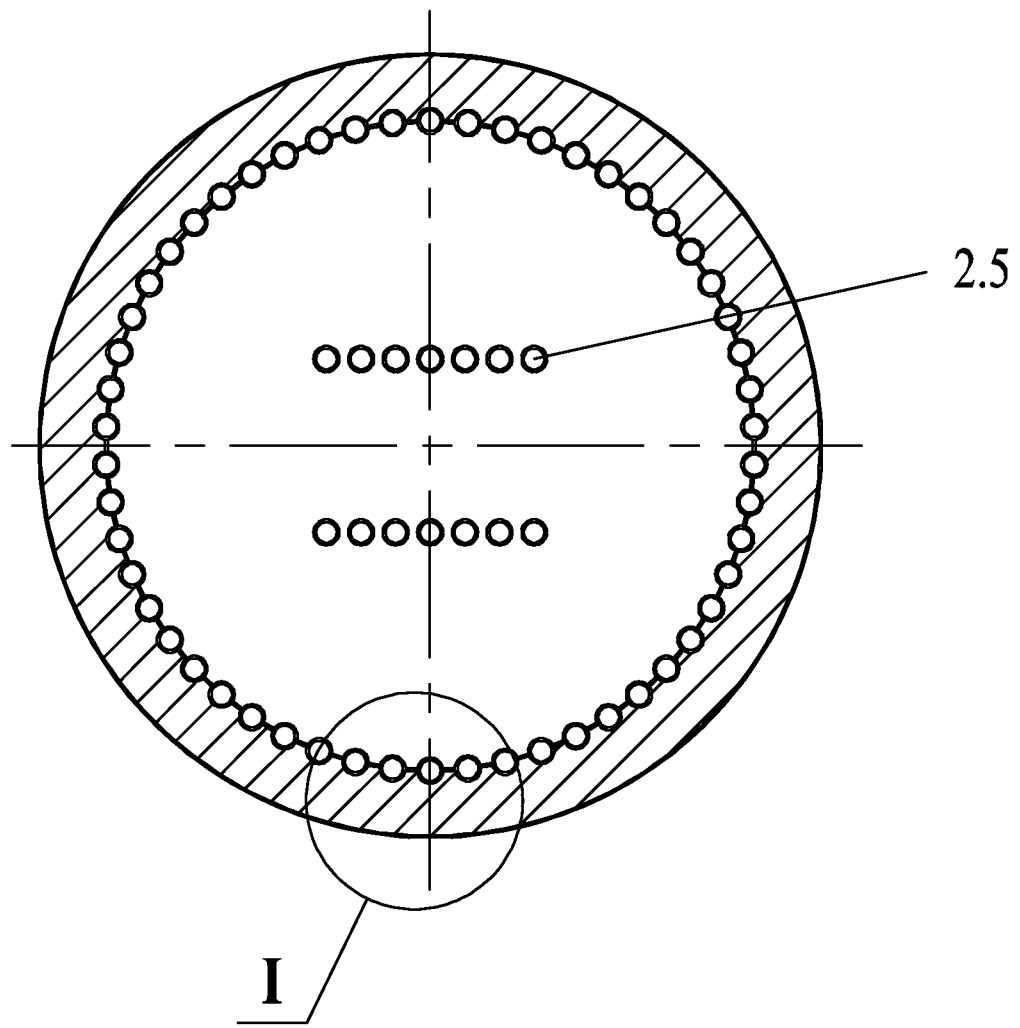
FIG. 6 is a sectional view taken from line C-C of FIG. 5.
Figure 7:
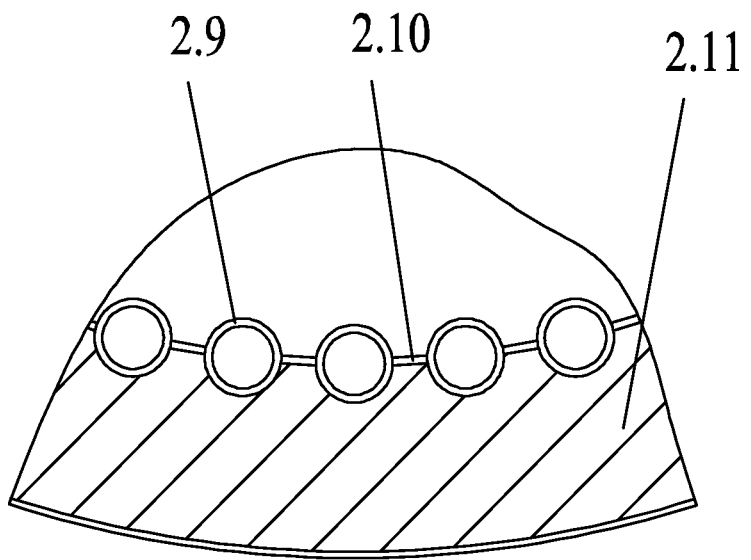
FIG. 7 is an enlarged view of part I of FIG. 6.

Preferably, the quench tower adopts a water-cooling quench tower 2 to solve problems existing in the common quench tower, such as, heavy weight, slow start and stop, and easy shedding of the refractory castable of the relatively large thickness. As shown in FIGS. 5-7, the water-cooling quench tower 2 comprises a sealed water-cooling cylinder 2.1. The sealed water-cooling cylinder is in a membrane structure, that is, the water-cooling cylinder 2.1 is surrounded by a plurality of second heating pipes 2.9, an upper end of the water-cooling cylinder 2.1 is in a shape of a cone formed by bending all the second heating pipes 2.9, and adjacent second heating pipes 2.9 are in sealed connection by using steel plate strips 2.10. Lower ends of all the second heating pipes 2.9 are connected to an inlet header 2.7 and upper ends of all the second heating pipes 2.9 are connected to an outlet header 2.3. The cooling water respectively passes through the inlet header 2.7, the second heating pipes 2.9, and the outlet header 2.3 to absorb the waste heat of the syngas, thereby decreasing the temperature of the syngas. A first inlet joint 2.4 is disposed on an upper part of a wall of the water-cooling cylinder 2.1 for inputting the syngas to be treated. A first outlet joint 2.6 is disposed on a lower part of the wall of the water-cooling cylinder 2.1 for outputting the syngas after treatment. The first inlet joint 2.4 and the first outlet joint 2.6 are made of steel flanges. The lower part of the water-cooling cylinder 2.1 is in the shape of an inverted cone, and a bottom of the inverted cone is provided with a slag outlet 2.8. Besides, the water-cooling cylinder 2.1 is provided with an additional heating structure 2.5 according to process and design requirements for enhancing the absorption of the waste heat of the syngas. Herein the additional heating structure 2.5 is a plurality of U-shaped heating pipes arranged on a top of the wall the water-cooling cylinder 2.1. A plurality of water spray pipes 2.2 are disposed on the top of the water-cooling cylinder 2.1, the number of the water spray pipes 2.2 is determined according to the requirements. An inner wall of the inverted cone part of the water-cooling cylinder 2.1 is provided with a second refractory layer 2.12 having a thickness of between 50 and 60 mm to maintain an inner surface of the inverted cone part at a certain temperature, thereby being beneficial for discharging the condensed slag and tar via the slag outlet. An outer surface of the water-cooling cylinder 2.1 is covered with a first heat insulation layer 2.11 which is made of thermal insulating cotton having good thermal insulation property and small density, so that the temperature of the outer surface of the water-cooling quench tower is maintained at no exceeding than 40° C. while the weight of the whole device does not increase. During the operation of the water-cooling quench device, the water spray pipes 2.2 works together with the second heating pipes 2.9 or are closed, leaving the syngas to be cooled by the second heating pipes 2.9 individually. Thus, the conventional cooling method by spraying water is changed. The water-cooling quench tower herein has a simple structure, light weight, convenient installation and maintenance, and is capable of recovering a part of the waste heat of the syngas. It should be understood that the common quench tower can also achieve the technical scheme of the invention, but effect thereof is not good.

Figure 8:
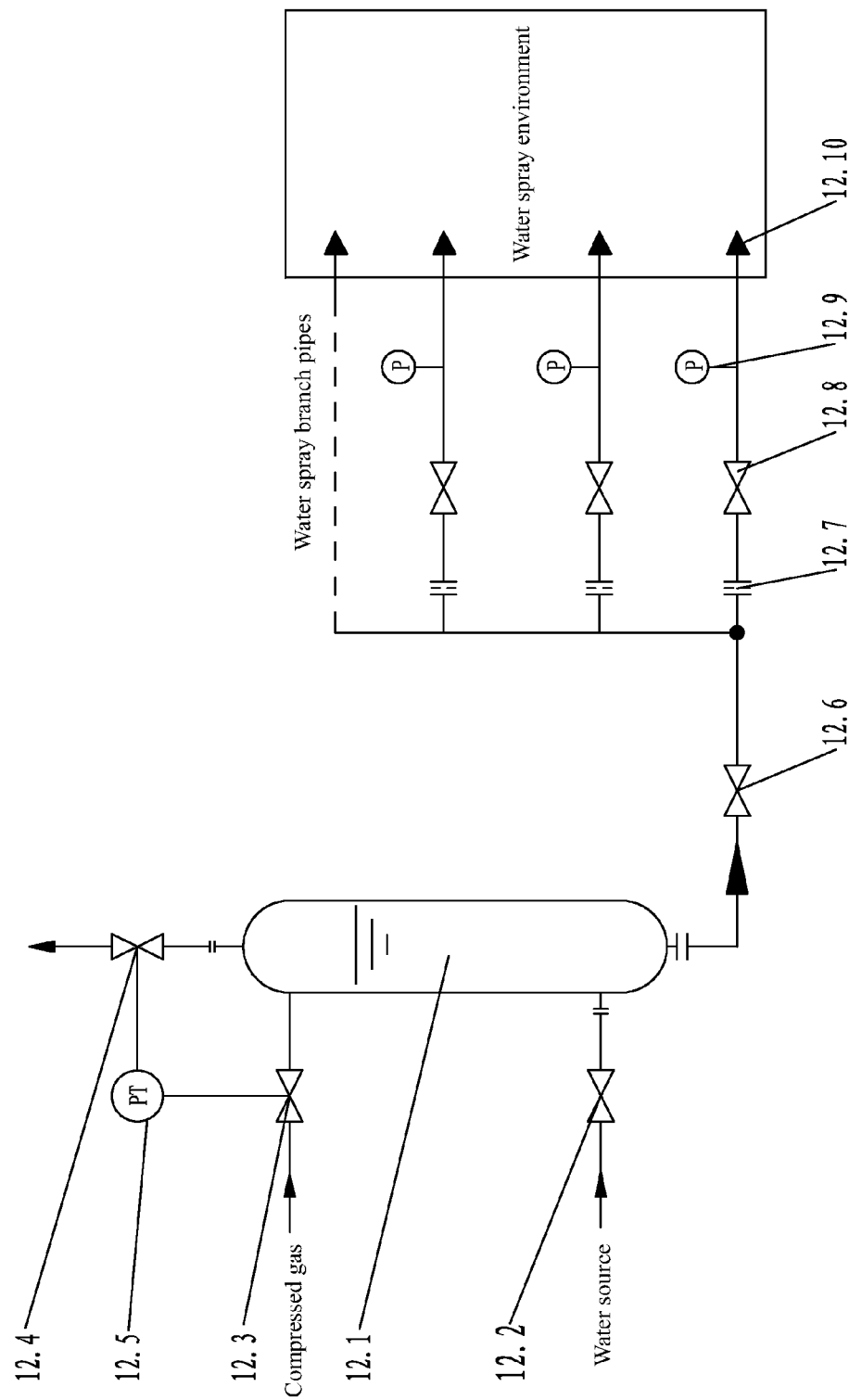
FIG. 8 is a spray-pipe system of water spray pipes of FIG. 5.

When the common quench tower or the above water-cooling quench tower 2 is adopted, the water spray pipes 2.2 are adopted. A spray-pipe system 12 for the water spray pipes 2.2 is provided herein. A common water spray atomization method includes pneumatic atomization and mechanical atomization. When the pneumatic atomization is adopted, a stable control of the flow and the effect of the spray water can be easily achieved. However, as the compressed gas for the atomization is required to enter the water spray environment, the use of the atomization is restricted to a certain degree. When the mechanical atomization is adopted, the water pressure inside water pipes often fluctuates within a certain amplitude, so that it is difficult to keep a relatively stable water pressure; and it is difficult to accurately regulate the water pressure when regulation of the water pressure is needed, besides, it requires a long period and a large energy consumption to regulate the water pressure to a set value. As shown in FIG. 8, the spray-pipe system for the water spray pipes 2.2 comprises: a surge tank 12.1, an adjustment controller 12.5, a water inlet valve 12.2, a gas inlet valve 12.3, a water outlet valve 12.6, and an atomizing nozzle 12.10. The surge tank 12.1 is a sealed tank made of steel. An upper part of the surge tank 12.1 is stored with compressed gas, and a lower part of the surge tank 12.1 is stored with water. The surge tank 12.1 is proved with a water inlet, a water outlet, a gas inlet, and a gas outlet, which are connected with the water inlet valve 12.2, the water outlet valve 12.6, a gas inlet valve 12.3, and a gas outlet valve 12.4, respectively. The water inlet valve 12.2 is disposed on a lower part of the surge tank 12.1 and is connected to an external water source which is supplied with water by water pipes of a certain pressure or directly by a water pump in a plant region. The water from the water-cooling flue enters the surge tank 12.1. The water outlet valve 12.2 is disposed on a bottom of the surge tank 12.1 and is connected to a plurality of water pray branch pipes. Each of the water pray branch pipe is connected to a throttle orifice 12.7, a shut-off valve 12.8, a pressure gage 12.9, and the atomizing nozzle 12.10, respectively. The gas inlet valve 12.3 is deposed on the upper part of the surge tank 12.1 and is connected to a compressed gas source in the plant region. The gas outlet valve 12.4 is disposed on a top of the surge tank 12.1 and is capable of communicating with the external environment. The adjustment controller 12.5 is a control module and is capable of controlling the start and close of the gas inlet valve 12.3 and the gas outlet valve 12.4 according to the pressure inside the surge tank 12.1 and the operation program, regulating the pressure inside the surge tank 12.1, whereby further controlling and regulating the pressure of the spray water in the pipe system. During the operation of the spray-pipe system 12, the external water source enters the surge tank 12.1 via the water inlet valve 12.2, the water in the surge tank 12.1 passes through the water outlet valve 12.6 and is distributed to each water spray branch pipe, where water flows through the throttle orifice 12.7 and the shut-off valve 12.8 and to the atomizing nozzle 12.10 for atomization, the atomized water is finally sprayed into the environment necessitating spray water, and the herein environment necessitating spray water is the quench tower. The throttle orifice 12.7 is used to balance the pressure of each water spray branch pipe and ensure the water spray effect of each water spray branch pipe. The shut-off valve 12.8 determines whether the water spray branch pipe it disposed works. The pressure gage 12.9 is used to display an accurate atomization pressure. The pressure inside the spray-pipe system 12 is controlled by the compressed gas in the surge tank 12.1 and can be can be accurately and fast regulated by the system. The compressed gas source has a broad selection range. The mechanical atomization is utilized, the compressed gas is prevented from entering the water spray environment, and the application range is broad. The whole process is controlled by the adjustment controller 12.5, thereby realizing the automatic operation. It should be understood that the pipe system of the common pneumatic atomization or chemical atomization can also achieve the technical scheme of the invention, but effect thereof is not good due to the defects described in the above.

Figure 9:
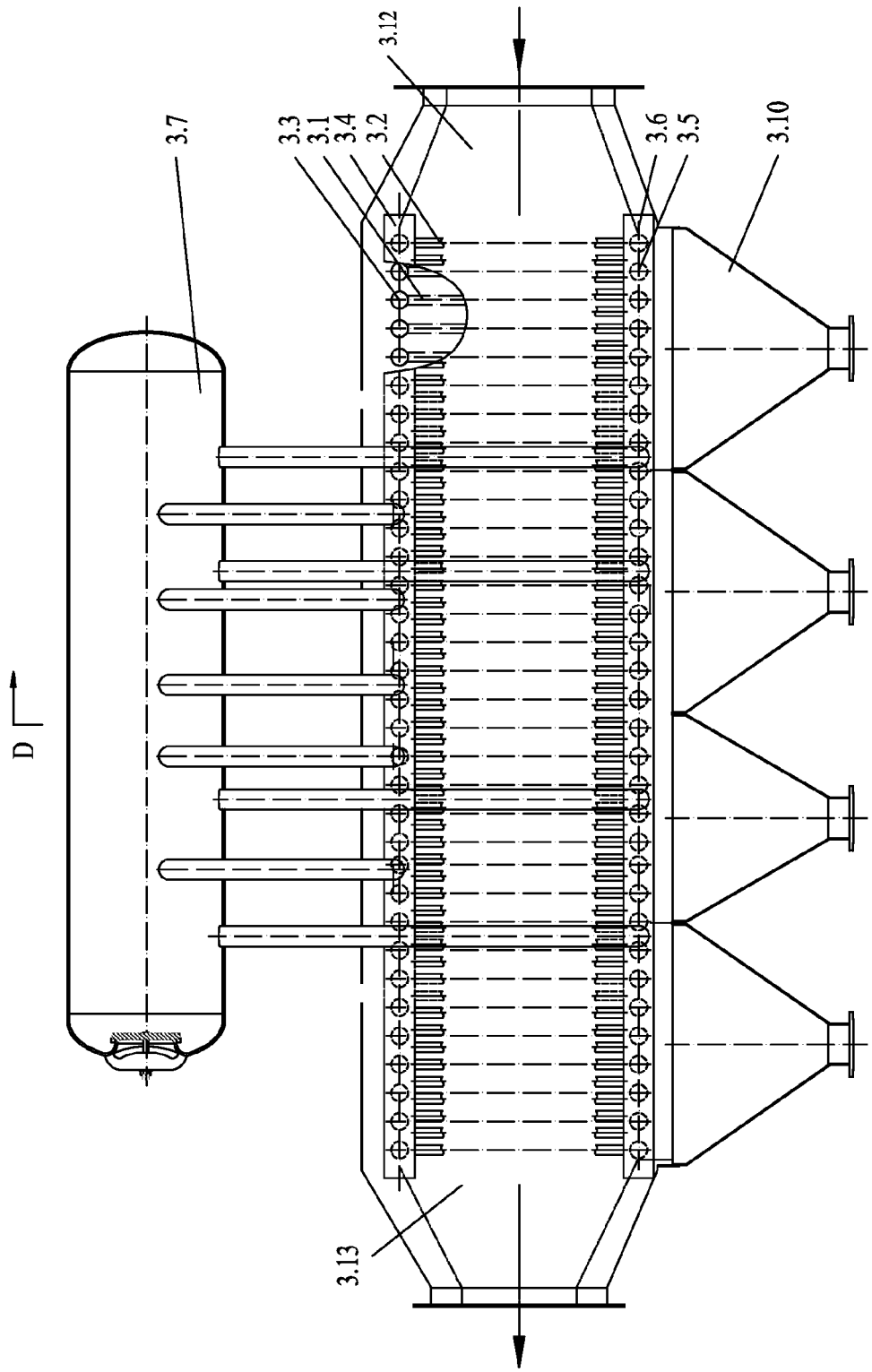
FIG. 9 is a structure diagram of a water-pipe waste heat boiler of FIG. 1.
Figure 10:
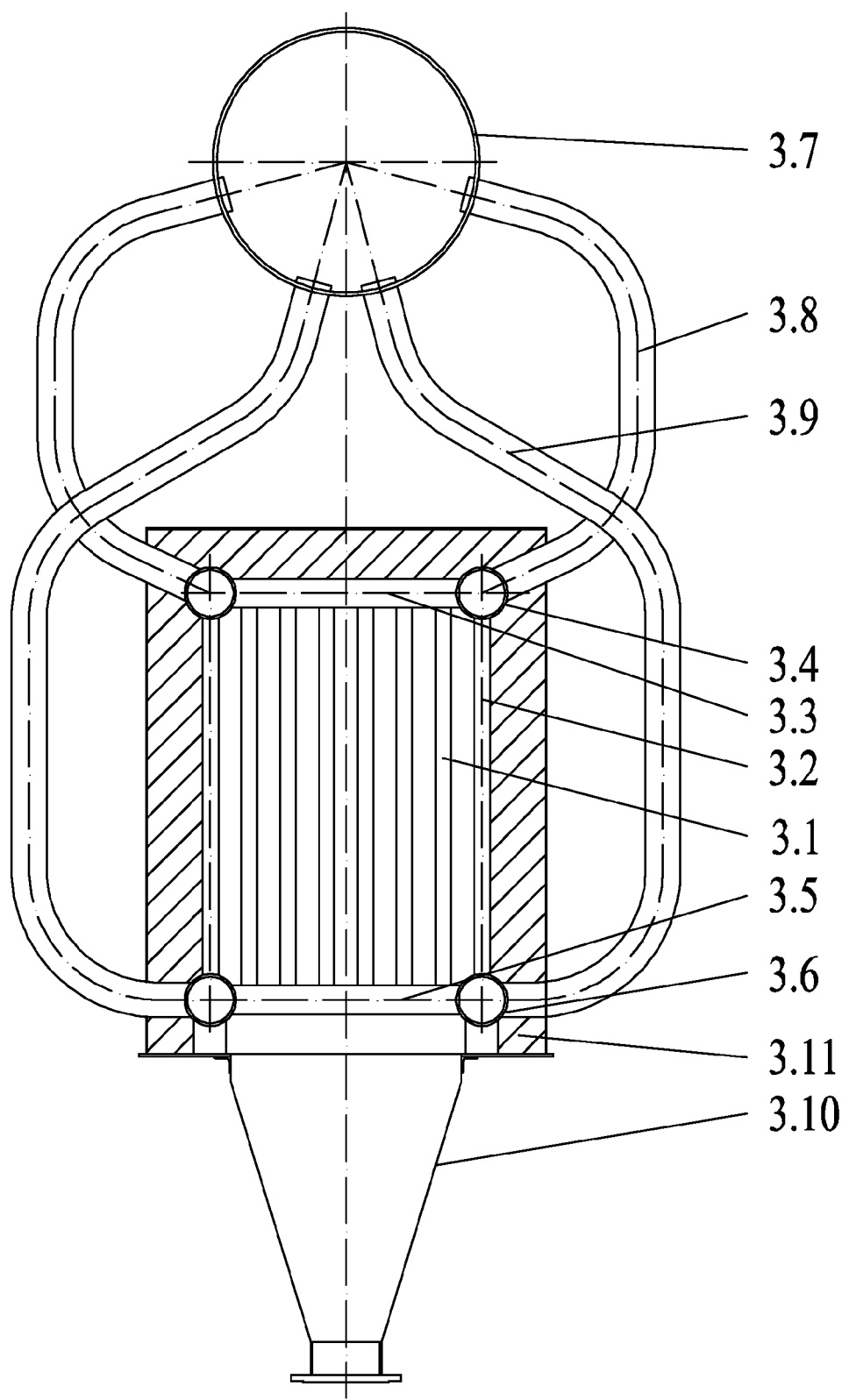
FIG. 10 is a sectional view taken from line D-D of FIG. 9.
Figure 11:
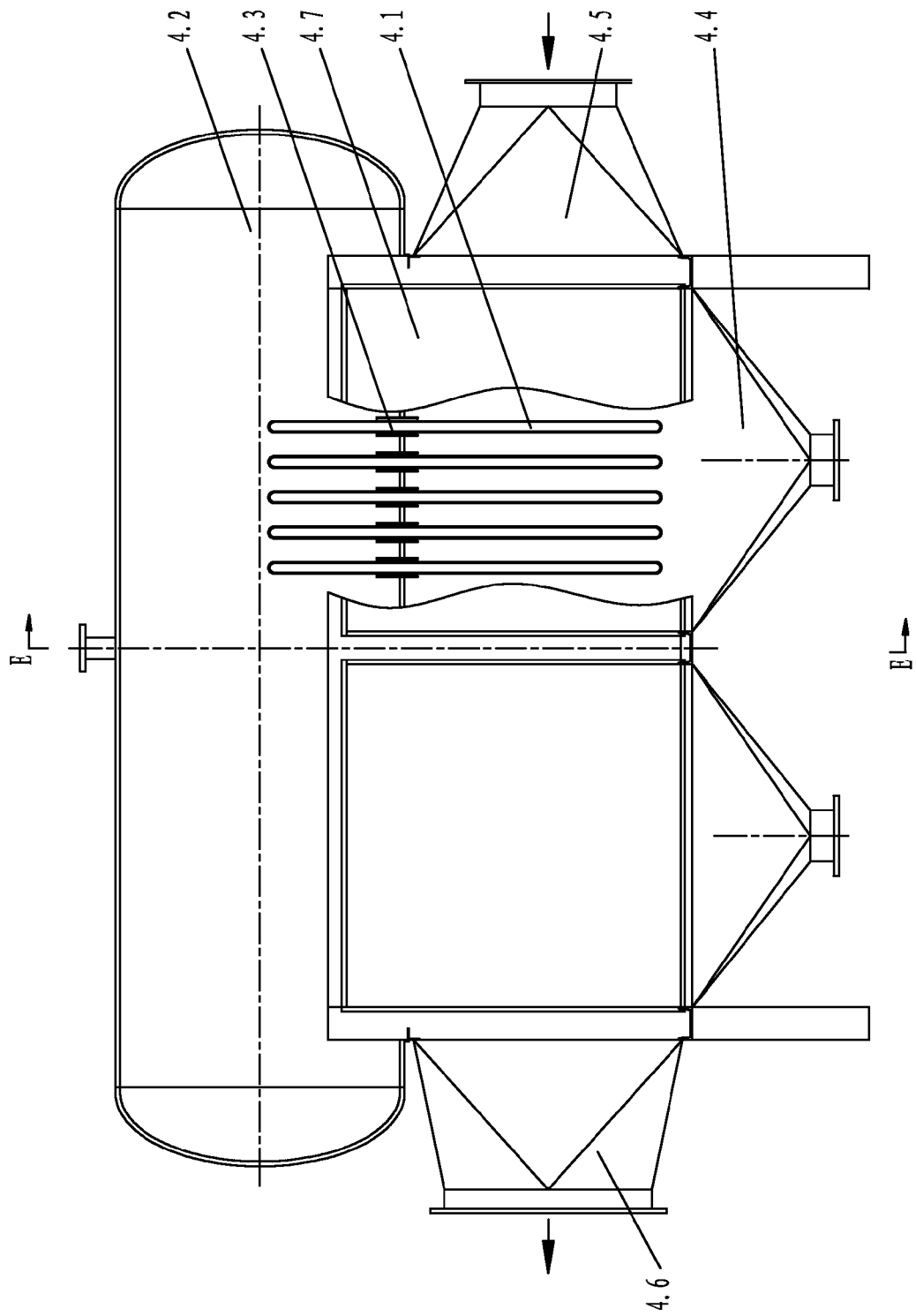
FIG. 11 is a structure diagram of a heat-pipe waste heat boiler of FIG. 1.
Figure 12:
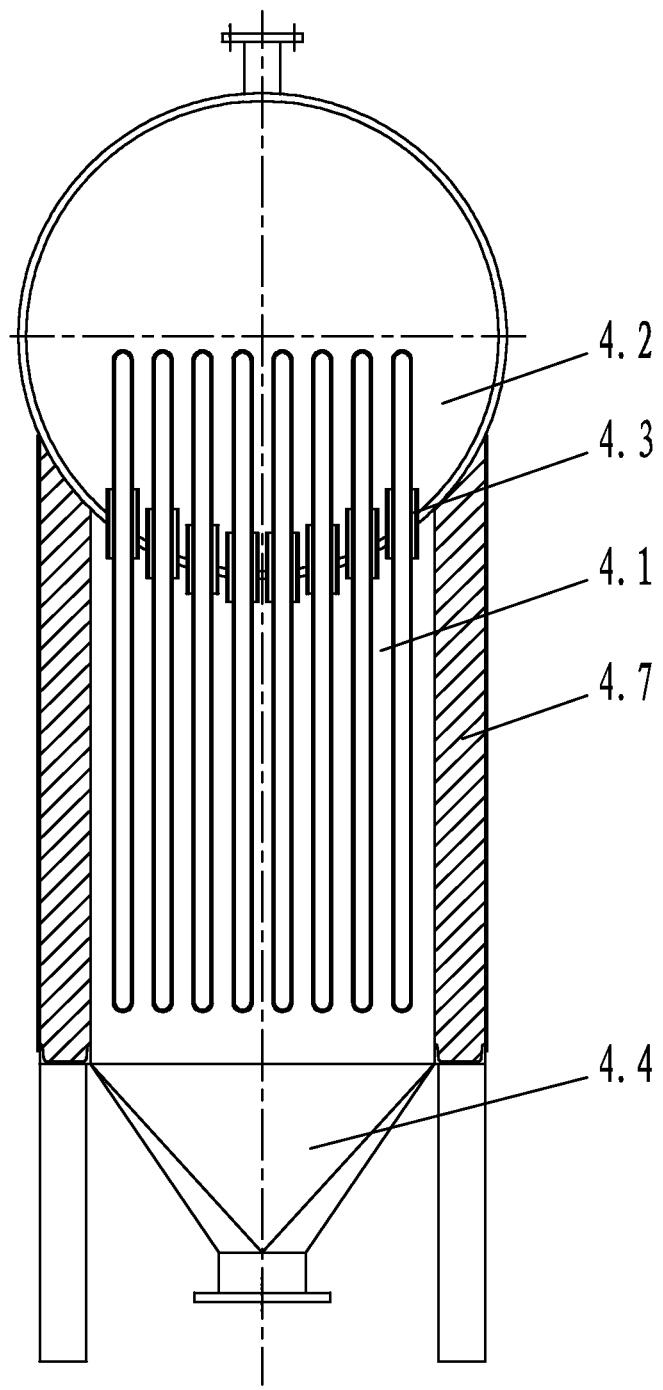
FIG. 12 is a sectional view taken from line E-E of FIG. 11.

As shown in FIGS. 9-10, the water-pipe waste heat boiler 3 comprises: a first drum 3.7 and a boiler body disposed beneath the first drum 3.7. The boiler body is in a horizontal structure. A second inlet joint 3.12 and a second outlet joint 3.13 are disposed on two horizontal ends of the boiler body, respectively. The high temperature syngas flows horizontally in the boiler. The boiler body comprises: a wall of the boiler and a plurality of third heating pipes 3.1 arranged longitudinally. Two side walls of the boiler body are membrane wall tube panels 3.2 functions in absorbing heat and sealing. The high temperature syngas flows among the third heating pipes 3.1 while the cooling water inside the third heating pipes 3.1 and the membrane wall tube panels 3.2 absorbs the waste heat of the syngas for decreasing the temperature of the syngas. Top ends and bottom ends of all the third heating pipes 3.1 are connected to an upper connector pipe 3.3 and a lower connector pipe 3.5, respectively, by welding. The upper connector pipe 3.3 and the lower connector pipe 3.5 are connected to the upper header 3.4 and the lower header 3.6, respectively. An upper end and a lower end of each membrane wall tube panel 3.2 are also connected to the upper header 3.4 and the lower header 3.6, respectively. The upper header 3.4 is connected to the first drum 3.7 via a steam outlet pipe 3.8, and an interface of the steam outlet pipe 3.8 is disposed in an upper part of the liquid surface in the first drum 3.7, so that the steam transformed from the cooling water after absorbing waste heat from the syngas is recovered and is output from an upper part of the first drum 3.7 for application in other process. The lower header 3.6 is connected to the bottom of the first drum 3.7 via a downcomer 3.9. The cooling water in the first drum 3.7 passes through the downcomer 3.9, the lower header 3.6, and the lower connector pipe 3.5 and enters the third heating pipes 3.1 and the membrane wall tube panels 3.2. Thus, a density difference exists between the steam and the cooling water, so that nature water circulation forms between the first drum 3.1 and the third heating pipes 3.1 and the membrane wall tube panels 3.2. When the biomass syngas flows among the third heating pipes 3.1, the temperature of the biomass syngas continuously decreases since the heat energy thereof is continuously absorbed by the cooling water. The tar in the syngas is continuously condensed and adheres to surfaces of the third heating pipes 3.1 and the membrane wall tube panels 3.2, and the tar is in the liquid state. Because the third heating pipes 3.1 and the membrane wall tube panels 3.2 are longitudinally arranged, the tar flows downwardly along with the third heating pipes 3.1 and the membrane wall tube panels 3.2 under the action of gravity and falls into an ash hopper 3.10 arranged on a bottom surface of the boiler body thereby being discharged from an ash outlet. The second inlet joint 3.12 and the second outlet joint 3.13 adopt conical structures, inner walls of which are covered with refractory layers made of refractory castable or are covered with water cooling coil pipes. Furthermore, second heat insulation layers 3.11 are covered on the membrane wall tube panels 3.2 and an outer surface of the top wall of the boiler body. The second heating insulation layers 3.11 are preferably made of thermal insulating cotton having good thermal insulation property and small density, so that the weight of the device is significantly lighter than that of the conventional waste heat boiler. The water-pipe waste heat boiler 3 is disposed at a process section where the temperature of the syngas is relatively high and the heat transfer efficiency is high. The high pressure steam recovered can be used in other process sections, and the self-weight of the water-pipe waste heat boiler 3 is light.

The heat-pipe waste heat boiler 4 is in a horizontal structure, and the syngas therein flows horizontally. The heat-pipe waste heat boiler 4 comprises fourth heating pipes 4.1 (heat pipes). A plurality of the fourth heating pipes 4.1 are arranged longitudinally in an order. The high temperature syngas flows horizontally among lower parts of the fourth heating pipes 4.1 in smooth pipe structures. Upper parts of the fourth heating pipes 4.1 are inserted in a second drum 4.2. A sealed pipe sleeve 4.3 is arranged in a position where the fourth heating pipes 4.1 and the second drum 4.2 are connected for avoiding metal heat stress resulted from a relatively large temperature difference. The second drum 4.2 is provided with a cooling water inlet and a heat water (or a steam outlet). Two sides of a pipe bundle formed by the fourth heating pipes 4.1 are provided with thermal-insulating walls 4.7. A contact surface between each thermal-insulating wall 4.7 and the syngas is provided with thermal-insulating bricks. An outer side of the thermal-insulating wall 4.7 is welded with steel plates for ensuring integral tightness. The thermal insulating cotton is arranged between the thermal-insulating bricks and the steel plates according to the requirement of the design. A third inlet joint 4.5 and a third outlet joint 4.6 of the heat-pipe waste heat boiler 4 are square and round joints in cone structures formed by rolling a steel plate. An inner wall of the third inlet joint 4.5 is casted with a thermal insulating or refractory castable. Both the third inlet joint 4.5 and the third outlet joint 4.6 are in sealed connection with the sealing steel plates arranged outside the thermal-insulating wall 4.7 by welding. Lower parts of the fourth heating pipes 4.1 is provided with an ash hopper 4.4 in square and round joint type rolled by a steel plate. The ash hopper 4.4 is also in sealed connection with the sealing steel plates arranged outside the thermal-insulating wall 4.7 by welding. When the heat-pipe waste heat boiler 4 operates, the lower parts of the fourth heating pipes 4.1 are heat absorption sections, and the upper parts of the fourth heating pipes 4.1 are heat release sections. The lower parts of the fourth heating pipes 4.1 absorb heat energy from the syngas and decrease the temperature of the syngas. The cooling water in the second drum 4.2 absorbs the heat energy released from the upper parts of the fourth heating pipes 4.1 and is transformed into hot water or steam which is then introduced out of the second drum 4.2 and supplied to other processes or for life use. In order to improve the heat utilization efficiency, the recovered hot water is supplied to the water-cooling flue device 4.2 and the water-cooling quench tower 2 for recycling. The tar is continuously condensed as the temperature of the syngas flowing in the heat-pipe waste heat boiler 4 decreases. The lower parts of the fourth heating pipes 4.1 do not directly contact with the cooling water inside the second drum 4.2. Thus, surfaces of the lower parts of the fourth heating pipes 4.1 maintain at a relatively high metal temperature, the temperature of the tar adhered to the surfaces thereof correspondingly increases, which decreases the flow viscosity of the tar. Meanwhile, the lower parts of the fourth heating pipes 4.1 are vertically downward smooth structures in the absence of any additional accessories that may increase the flow resistance of the tar, so that the tar adhering to and particularly attached on the surfaces of the fourth heating pipes 4.1 falls to the ash hopper 4.4 under the action of the gravity and finally discharged out. It is necessary to clean the surfaces of the fourth heating pipes 4.1 to improve the heat transfer efficiency of the heat-pipe waste heat boiler 4. It is beneficial for decreasing the corrosion of the syngas on the metal by maintaining the surfaces of the fourth heating pipes 4.1 at a relatively high temperature.

The common waste heat boiler rather than the above described water-pipe waste heat boiler 3 and the heat-pipe waste heat boiler 4 can also realize the function of the whole system, however, the heat transfer efficiency and the effect of the waste heat recovery of the common waste heat boiler are relatively poor.

The method for cooling and washing the biomass syngas using the above cooling and washing system is conduced as follows:

1) The biomass syngas produced in the biomass gasifier 10 having the temperature of between 1000 and 1100° C., a dust content of less than 20 g/Nm$^3$, and a tar content of less than 3 g/Nm$^3$ is introduced to the water-cooling quench tower 2 via the water-cooling flue device 1, where the syngas is preliminarily cooled, water is sprayed in the water-cooling quench tower for decreasing the temperature of the syngas to between 780 and 820° C. and condensing the slag in the syngas. The slag is discharged from a bottom of the water-cooling quench tower. Thus, heating surfaces of the waste heat boilers are prevented from slag pollution in the subsequent process, and stability of heat exchange performance of the waste heat boilers is ensured.

2) The syngas after slag condensation in the water-cooling quench tower 2 is then transported to the waste heat boiler. The waste heat boiler herein includes a high temperature section and a lower temperature section. The high temperature section employs the water-pipe waste heat boiler 3. The temperature of the syngas at the outlet of the high temperature section of the waste heat boiler is between 400 and 450° C., which is higher than a condensation point of the heavy tar, thereby avoiding the condensation of the tar. A design pressure in the water-pipe waste heat boiler is equal to or larger than 1.6 megapascal, thereby improving the temperature quality of the steam and satisfying requirements of corresponding chemical steam. The low temperature section employs the heat-pipe waste heat boiler 4 for improving the heat exchange effect. The temperature of the syngas at the outlet of low temperature section of the waste heat boiler is controlled at less than 200° C. to condense the heavy tar in this section and to collect the heavy tar by the chute. A design pressure in the heat-pipe waste heat boiler is between 0.5 and 1.6 megapascal, and the low pressure steam produced therein is supplied to the elector-precipitator for sweeping. The waste heat recovered by the water-cooling flue device 1 and the water-cooling quench tower 2 is transported to the heat-pipe waste heat boiler 4 for conducting steam-water separation, and the water is circulated for use.

3) Compared with the coal gas, the biomass syngas has both relatively low dust content and tar content. The preliminary dust removal does not require a cyclone dust collector or a Venturi dust collector, so that the syngas from the outlet of the heat-pipe waste heat boiler 4 is directly introduced to the packed scrubbing-cooling tower. Not only are purposes of dust removal and temperature decrease are realized, but also harmful gases, including $H_2S$, $NH_3$, and HCN, are removed by washing. Furthermore, the system resistance is decreased, and the electric consumption of the fan 7 is saved. The temperature of the syngas after washing is decreased to between 40 and 45° C.

4) The syngas is finally transported to the wet electro-precipitator to further remove the dust and the tar for ensuring both the dust content and the tar content of <10 mg/$Nm^3$ and the temperature of <45° C., which completely satisfies the gas requirement of subsequent processes. A sensible heat recovery is higher than 80%.

The qualified syngas is then pumped by the fan 7 to a wet gas holder for storage or is supplied to the downstream process for use. The flare 9 is in parallel connection with the wet gas holder and is an important device to combust waste gas when the system is started and the composition of the syngas is excessive.

The key of the invention is utilizing the quench tower and the waste heat boiler to cool the syngas and recover the waste heat and the heavy tar, and employing the scrubbing-cooling tower and the electro-precipitator to gradually remove the dust and the tar, so that the cooling and washing of the biomass syngas are achieved with low energy consumption and high efficiency. Thus, the scope of the protection of the invention is not limited by the above embodiments. It will be obvious to those skilled in the art that changes and modifications may be made without departing from the invention in its broader aspects. For example: the water-cooling flue device 1, the water-cooling quench tower 2, the water-pipe waste heat boiler 3, and the heat-pipe waste heat boiler 4 are not limited to the specific structures illustrated in the above, the technical scheme of the invention can also be achieved by using the common flue, the common quench tower, and the common waste heat boiler. The structures of the devices in the system are not limited to the specific structures described in the above embodiments, it is possible to carry out equivalent changes and modifications. The heat-pipe waste heat boiler 4, the water-cooling flue device 1, the water-cooling quench tower 2 are not limited to the water circulation type of the above embodiments either, it is possible to use individual water supply for the water-cooling flue device 1 and the water-cooling quench tower 2 and supply the recovered waste heat from the heat-pipe waste heat boiler for other processes. Parameters including temperature and pressure in different steps can be reasonably adjusted according to the temperature, the dust content, and the tar content of the syngas to be treated. The aim in the appended claims is to cover all such changes and modifications as fall within the true spirit and scope of the invention.

The invention claimed is:

1. A system for cooling and washing biomass syngas, comprising:
   a high temperature pyrolysis gasifier;
   a water-cooling quench tower connected downstream to the gasifier via a water-cooling flue device;
   a waste heat boiler, a scrubbing-cooling tower, and an electro-precipitator, all located downstream of the quench tower;
   wherein water-cooling flue device comprises a water-cooling flue and the water-cooling flue is formed by an inlet water-cooling flue, an upper-bend water-cooling flue, a straight water-cooling flue, a lower-bend water-cooling flue, and an outlet water-cooling flue in series and sealed connection;
   wherein the waste heat boiler comprises a water-pipe waste heat boiler and a heat-pipe waste heat boiler connected in series;
   wherein the quench tower is connected to the waste heat boiler, the scrubbing-cooling tower, and the electro-precipitator via syngas pipelines.

2. The system of claim 1, wherein the water-cooling flue device further comprises first heating pipes;
   the first heating pipes are circumferentially arranged, and adjacent first heating pipes are seamlessly connected via first steel plate strips to form an annular water-cooling wall; and
   a cavity of the annular water-cooling wall forms the flues of different sections.

3. The system of claim 2, wherein
   the inlet water-cooling flue comprises an inlet annular header and an inlet annular water-cooling wall;
   the inlet annular water-cooling wall is connected to the upper-bend water-cooling flue;
   the inlet annular header is provided with a cooling medium inlet pipe for inputting a cooling medium and a plurality of adaptors connected to the first heating pipes, respectively; and
   a structure of the outlet water-cooling flue is the same as that of the inlet water-cooling flue.

4. The system of claim 2, wherein an inner wall of the water-cooling flue is provided with a first refractory layer having a thickness of between 60 and 80 mm.

5. The system of claim 1, wherein
   the water-cooling quench tower comprises a sealed water-cooling cylinder;
   the water-cooling cylinder is surrounded by a plurality of second heating pipes, and adjacent second heating pipes are in sealed connection;
   lower ends of all the second heating pipes are connected to an inlet header for inputting cooling water; upper ends of all the second heating pipes are connected to an outlet header for outputting the cooling water;
   a first inlet joint is disposed on an upper part of a wall of the water-cooling cylinder for inputting the syngas to be treated;
   a first outlet joint is disposed on a lower part of the wall of the water-cooling cylinder for outputting the syngas after treatment; and
   the lower part of the water-cooling cylinder is in the shape of an inverted cone, and a bottom of the inverted cone is provided with a slag outlet.

6. The system of claim 5, wherein a plurality of water spray pipes are disposed on a top of the water-cooling cylinder.

7. The system of claim 6, wherein
   a spray-pipe system of the water spray pipe comprises: a surge tank and an atomizing nozzle;
   the water spray pipe is disposed between the surge tank and the atomizing nozzle;
   a water outlet of the surge tank is connected to the water spray pipe via a water outlet valve; a water inlet of the surge tank is connected to a water inlet valve; and
   the surge tank is further provided with a gas inlet and a gas outlet; the gas inlet is connected to a gas inlet valve; and the gas outlet is connected to a gas outlet valve.

8. The system of claim 1, wherein
the water-pipe waste heat boiler comprises: a first drum and a boiler body disposed beneath the first drum; the boiler body is in a horizontal structure;
a second inlet joint and a second outlet joint are disposed on two horizontal ends of the boiler body;
the boiler body comprises: a wall of the boiler and a plurality of third heating pipes arranged longitudinally; top ends of all the third heating pipes are connected to an upper header via an upper connector pipe; bottom ends of all the third heating pipes are connected to a lower header via a lower connector pipe;
the upper header is connected to the first drum via a steam outlet pipe for recovering steam; the lower header is connected to the bottom of the first drum via a downcomer for supplying cooling water; and
two side walls of the boiler body are membrane wall tube panels; an upper end and a lower end of each membrane wall tube panel are connected to the upper header and the lower header, respectively.

9. The system of claim 1, wherein
the heat-pipe waste heat boiler comprises: fourth heating pipes, a second drum, and a thermal-insulating wall; the fourth heating pipes are heat pipes; a heat release section of each heating pipe is inserted in the second drum, and a heat absorbing section of each heating pipe is disposed in the thermal-insulating wall; and
the thermal-insulating wall is connected to a third inlet joint and a third outlet joint by welding, and a lower end of the thermal-insulating wall is connected to an ash hopper by welding.

10. The system of claim 1, wherein
a water pipeline of the heat-pipe waste heat boiler is in series connection with a water pipeline of the water-cooling flue device and a water pipeline of the water-cooling quench tower to form a water circulating system.

11. The system of claim 1, wherein the scrubbing-cooling tower is a packed scrubbing-cooling tower.

12. The system of claim 1, wherein the electro-precipitator is a wet electro-precipitator.

13. The system of claim 1, wherein a gas outlet of the electro-precipitator is connected to a gas holder and a flare by a fan.

* * * * *